UNITED STATES PATENT OFFICE.

CARL FRIEDERICH MARIA SCHAERGES, OF BASLE, SWITZERLAND, ASSIGNOR TO F. HOFFMANN-LA ROCHE & CO., OF SAME PLACE.

THYROID COMPOUND.

SPECIFICATION forming part of Letters Patent No. 585,926, dated July 6, 1897.

Application filed December 1, 1896. Serial No. 614,129. (Specimens.)

*To all whom it may concern:*

Be it known that I, CARL FRIEDERICH MARIA SCHAERGES, doctor of philosophy, chemist, a subject of the Emperor of Germany, residing at Basle, Switzerland, have invented new and useful Improvements in the Production of Substances Containing the Active Constituents of the Thyroid Gland, of which the following is a clear and complete specification.

It is generally known that in cases of disease produced by the destruction or reduction of the thyroid gland (whether caused by degeneration or by ectomy) the feeding on fresh or dried thyroid gland or the injection of its juice is an infallible remedy. Animals suffering from thyroidal ectomy can thus be saved from certain death. But this holds good only for the preparations above mentioned, the remedial action of which has not yet been effected by any of the constituents hitherto known and more or less sharply differentiated. There is thus little doubt that such action of the thyroid gland does not depend upon any one of its constituents, but that it is produced, as is the case with many other medicaments, by the coöperation of the several constituents. On the other hand, having regard to the tendency or hability of the thyroid gland to rapid decomposition, it is of advantage to separate the active constituents entirely from the inactive constituents and to obtain the former in a permanent form. This separation is best effected by extraction by means of the physiological solution of common salt, which, while it sufficiently extracts the active constituents of the thyroid gland, leaves behind an inactive residue, the active constituents having all been dissolved.

I have now discovered that by means of tannic acid and its derivatives all the protein matters that have been dissolved can be precipitated quantitatively in the form of tannates from the extract of thyroid gland prepared with the solution of common salt. The solutions, when filtered off from the precipitates, are free from iodin. They do not show any thyroidal action, but the precipitate shows a complete thyroidal action.

The process is practically carried out as follows:

Example: One kilo of fresh thyroid glands freed from fat and reduced to a paste by finely chopping is well stirred for some hours with three kilos of a solution of common salt of 7.5 grams per liter. The solution is separated by centrifugal action from the solid parts, which are then heated for a second time in the same manner. Both extracts are clarified by filtration and mixed with three hundred grams of a ten-per-cent. solution of tannin. There is then produced at once a gelatinous deposit which is capable of filtration when heated to 70° or 80° centigrade, or the filtrate may first be heated to 70° or 80° centigrade and then mixed with the tannin solution. After having completely removed the liquids by filtration and washing with water the precipitate is dried and can be used without further treatment as a medicament. The dried product is a loose powder without smell and without savor and is insoluble in water. By agitating this powder with water and adding one to two drops of caustic lye a clear rose coloration appears. By boiling the product with acetic acid a gelatinous mass is obtained. On boiling it with concentrated mineral acids the product is decomposed and dissolved for the most part. The body can be converted into ashes only with difficulty, and it is necessary to aid its incineration with a little nitric acid. The residue of incineration is about 0.55 per cent. and contains a great quantity of phosphoric acid. By melting the product with sodium nitrate and sodium carbonate and dissolving the melted mass in water a solution is obtained which becomes clearly yellow on the addition of nitric acid containing nitrous acid. By agitating this solution with chloroform an intense iodin reaction takes place. The product contains about 0.4 per cent. of iodin.

Tannin, as stated in the above example, is employed by preference, but its derivatives, as tannates and other compounds containing tannic acid, may be employed also with good results.

Having thus described my invention, I claim—

1. The herein-described process for the production of the active constituents of the thyroid gland, by precipitating by means of tannic acid, a solution obtained from thyroid glands by means of common salt.

2. As a new article of manufacture, the herein-described substance containing the active constituents of the thyroid gland in the form of tannates, which substance is insoluble in water, constitutes in a dry state a loose powder without smell and without savor, is transformed into a gelatinous mass on boiling with acetic acid and contains about 0.4 per cent. of iodin.

In witness whereof I have hereunto signed my name in the presence of two subscribing witnesses.

CARL FRIEDERICH MARIA SCHAERGES.

Witnesses:
  GEORGE GIFFORD,
  AMAND RITTER.